May 24, 1932.　　T. T. BAKER　　1,860,218
COLOR PHOTOGRAPHY
Filed March 7, 1929

Patented May 24, 1932

1,860,218

UNITED STATES PATENT OFFICE

THOMAS THORNE BAKER, OF HATCH END, ENGLAND, ASSIGNOR TO HAROLD WADE, OF LONDON, ENGLAND

COLOR PHOTOGRAPHY

Application filed March 7, 1929, Serial No. 345,247, and in Great Britain August 8, 1928.

This invention consists of improvements in or relating to color photography and particularly to the reproduction of transparencies in natural colors from master pictures. The invention is applicable to the production of positive photographic images in natural colors and especially to the production of cinematograph pictures in natural colors.

It is well known that various processes exist by which photographic sensitive surfaces can be exposed in a camera through a multicolor screen made up of tiny colored elements (generally in two, three, or four colors) distributed in predetermined proportions. The production of such multicolor screens is typified by the process described in copending application, Serial No. 345,604, L. Dufay, filed March 8, 1929, which application has matured into Letters Patent 1,805,361, issued May 12, 1931, and a multicolor screen of this type is illustrated diagrammatically in Figure 1 of the accompanying drawings.

In the production of films for photography in natural colors, the film bearing the multicolor screen is coated with a panchromatic emulsion. Such film is exposed through the color screen, in the well known manner, and if, after exposure, the emulsion is developed and the negative image is converted into a positive transparency, the picture, when viewed by transmitted light, appears in the natural colors. Alternatively, the transparent picture so produced may be left in the negative condition, when the colors of the original subject will appear as complementaries.

This invention particularly relates to the production or duplication of positive images by photographic printing. This may be done in two ways. Thus, a positive in natural colors may be employed as a master copy and from it may be printed by contact, or by projection, further similar positives, the sensitive film (always exposed through the multi-colored screen or reseau) being developed and reversed in each case, making a positive from a positive; or a negative in complementary colors may be employed, and from it may be printed by contact or by projection positive copies, the sensitive film being merely developed and fixed in the well-known manner.

The invention will now be described with reference to the accompanying drawings, which it should be understood are diagrammatic only, and in which:—

Figure 1:
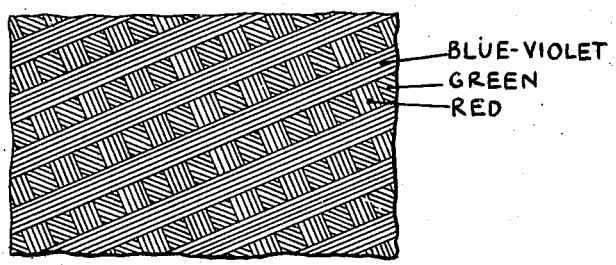
Figure 1 illustrates an example of a multicolor screen of the type employed in the present invention.
Figure 2:
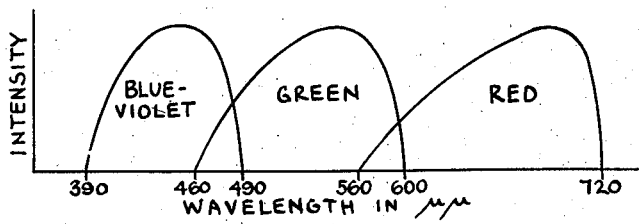
Figure 2 shows the spectral transmissions of the elements of the multicolor screen associated with the master transparency.

In order to obtain the original master cinematograph film the shortest possible exposure is indispensable and therefore it is necessary to employ dyestuffs in the elements of the multicolor screen associated with the master film which transmit as high a proportion of light as possible. This has, however, the serious disadvantage that the spectral transmissions of the dyestuffs used in the elements of the multicolor screen for the master film are so broad that they include more of the spectrum than the theoretical primaries and hence very considerable overlapping is obtained, and therefore a certain amount of white light produced by the overlaps is transmitted by the screen, which has the effect of diluting the colors so that they appear very feeble—(see Figure 2).

When printing from the master film on to a copying film, however, it is not so essential to have a short exposure, and one feature of the present invention lies in employing a multicolor screen for the copying film whose elements transmit actually narrower spectral bands than the theoretical primaries.

It has been found possible to correct the undesirable dilution of the colors in the master film in this way, as if the spectral transmissions of the elements of the copying screen are chosen sufficiently narrow, the overlaps will not be copied when printing and the undesirable dilution of the colors will be obviated. The colors of the copying film will therefore be more pure and saturated than those in the master film, although there may be a certain loss of truth of color rendering owing to the loss of some intermediate colors.

There are three factors over which control may be exercised:

(1) The nature and degree of saturation of the dyestuffs constituting the multicolor screen associated with the copying film;

(2) The intensity of the silver deposit in the master film;

(3) The nature of the copying emulsion and hence the contrast of the copying film.

Figure 3:
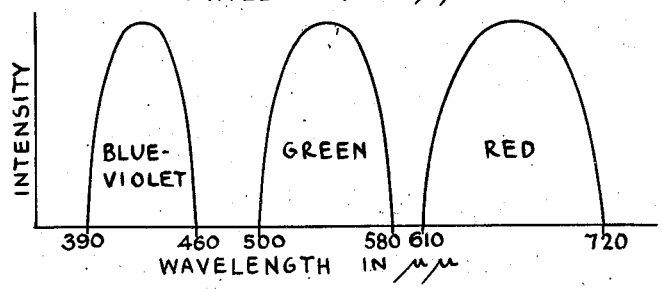
Figure 3 shows the spectral transmissions of the elements of the multicolor screen associated with the copying transparency.

(1) The dyestuffs used in manufacturing the copying screen may be so chosen and concentrated that no overlapping at all occurs, or so that gaps between the transmissions are actually obtained (see Figure 3). Dyes satisfactory for this purpose are: (1) violet, Victoria blue; (2) red, auramine mixed with fuchsia; (3) green, malachite green.

(2) The truth and brilliancy of color may be increased if the intensity of the silver deposit in the master film after exposure and development is increased. It is well known that certain intensifiers, such as uranium ferrocyanide are capable of selectively intensifying the high lights or the shadows according as to whether an excess of uranium or of ferrocyanide is present. A similar selective effect may be obtained by first reducing the image e. g. with persulphate if it is desired to remove silver from the high densities, or with ferricyanide if it is desired to remove silver from the low densities, and then intensifying with an ordinary intensifier which does not produce any selective effect.

The quantity of metallic silver originally present in the emulsion is of the order of 80 mg. per sq. decimetre. This is reduced to about 40 mg. after reversal of the image. The process of selective reduction removes about 2.35 mg. of silver per sq. decimetre. On reintensification the main body of the deposit contains about 20–40 mg. of silver per sq. dcm. The actual weight of metal deposited and hence the blackening effect is increased by about ⅓ owing to the mercury deposited from the intensifier.

Figure 4:
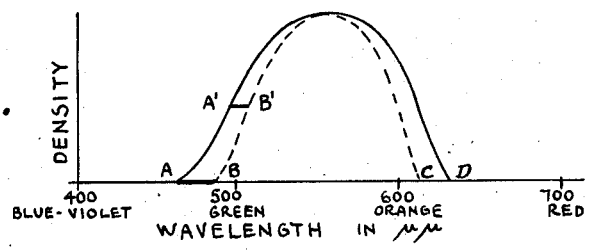
Figure 4 is a curve between the density of the silver deposit and the wave length for all of the green elements of the multicolor screen.

According to the invention these effects may be used to improve the truth of color rendering, and to act as follows:

Considering a photograph taken through one of the green elements in the multicolor screen, the green being too pale, too wide a band of the spectrum is recorded, as shown by the plain line A A' D in Figure 4.

If the master image is reduced in such a way as selectively to reduce the lower densities in preference to the higher ones, on subsequent intensification a transmission as indicated by the dotted line B B' D will be obtained. In other words by selective reduction and intensification the effects of the too-light multicolor screen can be ameliorated so that the result is the same as if a multicolor screen of deeper colors has been used.

It will be understood that the wave lengths between A and B, and between C and D, which have produced only a faint silver deposit (and which have combined with wave lengths on the fringes of the bands transmitted by the other elements of the colors screen to form white light and so degrade the colors of the picture) will be eliminated. The treatment with the selective reducer is carried out in such a manner as to remove all the silver deposit due to the wave lengths between A and B and between C and D, and a certain amount of the silver deposit due to the remaining wave lengths between B and C. As after this treatment no silver deposit at all is left corresponding to wave lengths between A and B, or between C and D, subsequent intensification of the image will not produce any effect on these portions of the band. The silver deposits corresponding to wave lengths between B and C will, however, be reinforced up to practically their original value, with the result that the state of affairs after the intensification treatment will be represented by the curve B B' C. The result of this treatment will be that the colors of the film will appear much stronger owing to the absence of the undesirable dilution by white light.

An example of the method of carrying this feature of the invention into effect will now be given. The master film is first of all immersed in a 5% solution of sodium thiosulphate, tinted to a pale lemon yellow color by the addition of a small quantity of potassium ferricyanide, for a period of from 30 to 45 seconds. This solution has the well known effect of attacking the lower densities preferentially. After a short rinse in water, the film is bleached in a solution containing about 6% each of mercuric chloride and sodium chloride acidulated with hydrochloric acid, and after further washing it is reblackened by re-immersion in a 5% solution of ammonia. This treatment has the effect of selectively removing the faint general silver deposit due to the light transmitted by the overlapping portions of the spectral transmissions of the elements of the master color screen.

(3) The width of the spectral bands transmitted by the elements of the multicolor screen associated with the copying film may also be decreased by increasing the gamma of the copying film emulsion, and hence the contrast of the image produced thereon. Preferably the master emulsion should have a gamma of about 0.8 while the copying emulsion should have a gamma of about 1.

This is equivalent to reduction and intensification.

This effect depends on the inertia of the photographic emulsion.

Figure 5:
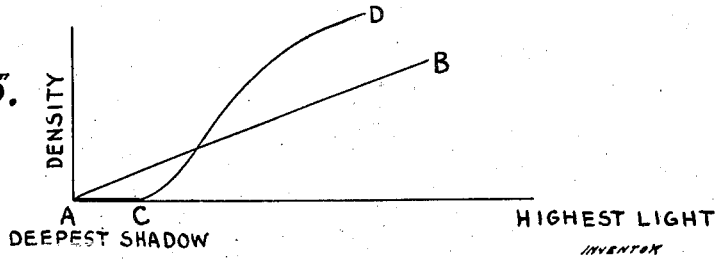
Figure 5 shows the effect of the contrast of the emulsions on the density of the silver deposit.

This may be understood by referring to Figure 5, wherein A B represents the density of the silver deposits behind the different tones of a non-contrasty emulsion, whilst C D represents a similar curve for a more contrasty emulsion: owing to the inertia of the photographic emulsion, the tones between A and C will not be recorded by it. In this case it is clear that owing to the contrasty nature of the emulsion of the copying film, the comparatively faint illumination due to the wave lengths on the fringes of the bands transmitted by the elements of the master color screen (i. e. those wave lengths which combine to form white light and so dilute the colors of the master picture) will not be recorded to the same extent by the copying film as would have been the case if a non-contrasty emulsion had been employed for that film.

A great drawback to the colored copies, especially in small sizes, such as are used for cinematography, is the lack of sharp definition caused by the separation of the two photo-sensitive layers by the multicolor screen and its support. This has been overcome by illuminating the printing frame with parallel rays of light so that the image does not spread during the passage of the rays through the multicolor screen support. This may be done, for example, by using a lamp with a point-source of light placed at the focal distance from a condensing lens so that the emitted rays are parallel to the axis of the lens and the two films are placed at right angles to the parallel rays.

It is advantageous to employ this invention to conjunction with that described in the copending U. S. application, Serial 345,246, T. T. Baker, filed March 7, 1929.

I claim:—

1. A method for the production of multicolor screen cinematograph films which consists in recording a master picture on a film associated with a weakly colored screen having elements which transmit overlapping spectral bands, treating the photographic image on the master film with a reducer capable of preferentially attacking the low densities, reintensifying the image, and printing therefrom on to a copying film of the color screen type.

2. A method for the production of multicolor screen cinematograph films which consists in recording a master picture on a film associated with a weakly colored screen having elements which transmit overlapping spectral bands, correcting the dilution of the colors of said master film by white light due to the overlap of the spectral bands of color transmitted by the said weakly colored screen, treating the photographic image on the master film with a reducer capable of preferentially attacking the low densities, reintensifying the image, and printing therefrom on to a copying film of the color screen type.

3. A method for the production of multicolor screen cinematograph films which consists in recording a master picture on a film associated with a weakly colored screen having elements which transmit overlapping spectral bands, treating the photographic image on the master film with a reducer capable of preferentially attacking the low densities, reintensifying the image, and printing therefrom on to a copying film associated with a color screen the elements of which are adapted to transmit non-overlapping spectral bands.

4. A method for the production of multicolor screen cinematograph films which consists in recording a master picture on a film associated with a weakly colored screen having elements which transmit overlapping spectral bands, correcting the dilution of the colors of said master film by white light due to the overlap of the spectral bands of color transmitted by the said weakly colored screen, treating the photographic image on the master film with a reducer capable of preferenetially attacking the low densities reintensifying the image, and printing therefrom on to a copying film associated with a color screen the elements of which are adapted to transmit non-overlapping spectral bands.

5. A method for the production of multicolor screen cinematograph films which consists in recording a master picture on a film associated with a weakly colored screen having elements which transmit over-lapping spectral bands, reversing the master picture to form a positive, treating the photographic image on the master film with a reducer capable of preferentially attacking the low densities, reintensifying the image, and printing therefrom on to a copying film of the color screen type and reversing the image on the copying film to form a positive.

6. A method for the production of multicolor screen cinematograph films which consists in recording a master picture on a film associated with a weakly colored screen having elements which transmit overlapping spectral bands, treating the photographic image on the master film with a reducer capable of preferentially attacking the low densities, reintensifying the image, and printing therefrom on to a copying film of the color screen type having an emulsion the gamma of which is greater than that of the emulsion of the master film.

7. A method for the production of multicolor screen cinematograph films which consists in recording a master picture on a film associated with a weakly colored screen having elements which transmit overlapping spectral bands, treating the photographic image on the master film with a reducer capable of preferentially attacking the low densities, reintensifying the image, and printing therefrom to a copying film of the color screen type by means of a beam of parallel light projected at right angles to the two films.

In testimony whereof I affix my signature.
THOMAS THORNE BAKER.